(12) United States Patent
Sunde et al.

(10) Patent No.: US 11,316,366 B2
(45) Date of Patent: *Apr. 26, 2022

(54) ELECTRICAL DOCKING STATION

(71) Applicant: Trystar, LLC, Faribault, MN (US)

(72) Inventors: Jonathan A. Sunde, Austin, MN (US); Jared A. Smith, Ellendale, MN (US); Griffin A. Hebel, New Prague, MN (US)

(73) Assignee: Trystar, LLC, Faribault, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,545

(22) Filed: Oct. 26, 2020

(65) Prior Publication Data

US 2021/0044144 A1 Feb. 11, 2021

Related U.S. Application Data

(63) Continuation of application No. 16/698,667, filed on Nov. 27, 2019, now Pat. No. 10,847,996.

(Continued)

(51) Int. Cl.
*H02J 9/06* (2006.01)
*H02B 1/32* (2006.01)
(Continued)

(52) U.S. Cl.
CPC ............... *H02J 9/068* (2020.01); *G08B 7/06* (2013.01); *G08B 21/18* (2013.01); *H02B 1/306* (2013.01); *H02B 1/32* (2013.01); *H02B 1/38* (2013.01)

(58) Field of Classification Search
CPC .......... H02J 9/068; G08B 7/06; G08B 21/18; H02B 1/306; H02B 1/32; H02B 1/38
(Continued)

(56) References Cited

U.S. PATENT DOCUMENTS 3,631,324 A 12/1971 Jones
5,581,133 A 12/1996 Smith et al.
(Continued)

FOREIGN PATENT DOCUMENTS

CN 201289969 Y 8/2009
FR 2814600 A1 3/2002

OTHER PUBLICATIONS

"The safe way to transfer power, Quick-connect double-throw safety switch," Eaton Corporation pamphlet, Cleveland, Ohio, Nov. 2010, No. BR00801004E/Z10433, pp. 1-7.

(Continued)

*Primary Examiner* — Kerri L McNally
(74) *Attorney, Agent, or Firm* — Fredriksen & Byron, P.A.

(57) ABSTRACT

Systems and apparatuses for access-controlled electrical docking stations that automatically switch power to an electrical system between generator power and utility power are disclosed herein. An illustrative electrical docking station can include a cabinet that houses a circuit breaker, a generator interface to connect generators to the electrical docking station, an Automatic Transfer Switch, and a power supply. The power supply can supply converted DC power and protection to different accessories for the electrical docking station including an alarm, a supervisory control and data acquisition (SCADA), and a locking mechanism. The locking mechanism can be configured to lock a door to the generator connectors in a closed position when the ATS is energized by a generator and to not lock the door when the door is in an open position. In some such circumstances, the alarm can shine green or provide an audible alarm and shine red respectively.

25 Claims, 14 Drawing Sheets

Related U.S. Application Data

(60) Provisional application No. 62/773,556, filed on Nov. 30, 2018.

(51) Int. Cl.
   *G08B 21/18* (2006.01)
   *H02B 1/30* (2006.01)
   *G08B 7/06* (2006.01)
   *H02B 1/38* (2006.01)

(58) Field of Classification Search
   USPC .................................................... 340/686.1
   See application file for complete search history.

(56) References Cited

U.S. PATENT DOCUMENTS

| | | | |
|---|---|---|---|
| 5,819,567 A | 10/1998 | Eden, Jr. | |
| 6,096,986 A | 8/2000 | Flegel | |
| 6,184,595 B1 | 2/2001 | Flegel | |
| 6,424,060 B1 * | 7/2002 | Shiely | H01H 9/26 307/328 |
| 6,521,849 B1 | 2/2003 | Flegel | |
| 6,621,689 B1 | 9/2003 | Flegel | |
| 6,995,327 B1 | 2/2006 | Shepstone et al. | |
| 7,030,514 B2 * | 4/2006 | Wareham | H02J 9/066 307/126 |
| 7,136,278 B2 * | 11/2006 | Allen | H01H 9/0264 361/647 |
| 7,250,875 B2 | 7/2007 | Schnackenberg | |
| 7,418,314 B2 | 8/2008 | Rasmussen et al. | |
| 7,462,792 B1 * | 12/2008 | Hellmers | H01H 9/26 200/50.33 |
| 7,471,505 B2 * | 12/2008 | Gull | H02J 3/38 361/627 |
| 7,602,083 B1 * | 10/2009 | Flegel | H02J 9/04 307/126 |
| 7,616,432 B2 * | 11/2009 | Luebke | H02J 9/06 361/631 |
| 8,395,883 B2 * | 3/2013 | Takata | E05C 7/00 361/641 |
| 8,654,514 B2 | 2/2014 | Takata et al. | |
| 10,847,996 B2 * | 11/2020 | Sunde | H02J 9/068 |
| 2008/0074288 A1 * | 3/2008 | Schnackenberg | G08G 1/095 340/907 |
| 2014/0084766 A1 * | 3/2014 | Smith | H05K 5/0217 312/292 |
| 2014/0132417 A1 * | 5/2014 | Clark | H01H 33/002 340/654 |

OTHER PUBLICATIONS

"Generator Connection Cabinets," accessed online at http://www.Berthoidelectric.com/gusBerthold/portableGeneratorConnectionCabinets.asp on Apr. 28, 2011, Berthold Electric Company, Elgin, Illinois 2006, 1 pg.

"Quick-Connect generator Switches," video from Eaton Corporation as accessed online at http://www1.eatonelectrical.com/flash/quickconnect/QCGSlong.html on Apr. 28, 2011.

* cited by examiner

ELECTRICAL DOCKING STATION

RELATED APPLICATIONS

The present application is a continuation of U.S. patent application Ser. No. 16/698,667, filed on Nov. 27, 2019, which claims priority to U.S. Provisional Patent Application No. 62/773,556, filed Nov. 30, 2018, the entire contents of both of which are incorporated herein by reference.

TECHNICAL FIELD

This disclosure relates generally to the field of electrical technology and, more particularly, to devices, systems, and methods for switching an electrical system between generator power and utility power.

BACKGROUND

Disconnecting an electrical connector from an electrical docking station while the electrical docking station is energized, either accidentally or purposefully, may create dangerous arcing between the electrical connector and the connector receptacle. Such arcing can short out an electrical system, electrocute an operator, or cause an explosion. Traditionally, electrical docking stations were only required to post signs warning a user to make sure the electrical docking station is not energized when disconnecting generator connectors from the electrical docking station. Further, traditional electrical docking stations place the utility wires behind the generator connectors. This leads to complicated access to utility wires in the electrical docking station and unnecessarily deep electrical docking stations that require extra equipment (e.g., legs) to remain stable when mounted on a wall of a building. Examples of electrical docking stations include generator docking stations, output panels/docking stations, company switches, load bank docking stations, house panels, temporary connection cabinets, dual breaker docking stations, generator connection cabinets, generator roll up boxes (GRUBs), and generator tap boxes.

SUMMARY

Exemplary embodiments are described herein for safely switching an electrical system between generator power and utility power. Various embodiments described herein can provide a safe, reliable, and accessible electrical docking station by incorporating access-controlled compartments with convenient access points and the ability to accommodate several different pieces of hardware in a compact space. An illustrative electrical docking station may be a cabinet with a middle/main section, an upper section above the main section, and a lower section beneath the main section. One or more covers can conceal a cabinet interior at respective sections of the cabinet. The utility power and generator power connectors and wires can be positioned side by side along the width of the cabinet at the lower section of the cabinet.

The cabinet can house hardware including a circuit breaker for regulating utility power to the electrical docking station, a generator interface to connect permanent and/or portable generators to the electrical docking station, an Automatic Transfer Switch (ATS), and a power supply. The power supply can supply converted DC power to various hardware in the electrical docking station, including an alarm and a locking mechanism, as well as protect various hardware from overcurrent. The locking mechanism can be configured to lock a hinged lower door when in a closed position while the ATS is energized by a generator. In such circumstances, the alarm can shine a confirmation color (e.g., green). The locking mechanism can be configured to not lock the hinged lower door when the hinged lower door is in an open position. In such circumstances, if the ATS is energized by a generator, the alarm can provide an audible alarm and/or shine a warning color (e.g., red).

In one aspect, an electrical docking station can include a cabinet, a generator interface, a transfer switch, and an electro-mechanical locking mechanism. The cabinet may include a generator connection compartment and a utility connection compartment. The generator connection compartment can include a door movable between an open position and a closed position. The utility connection compartment may be configured to house utility wires. The generator interface may be housed in the generator connection compartment and configured to be electrically connected to a generator. The transfer switch can be housed in the cabinet and electrically connected to the generator interface. In many instances, the transfer switch is configured to be electrically connected to the utility wires and to a building electrical system. The transfer switch can be configured to switch between electrically connecting the building electrical system to the generator interface and electrically connecting the building electrical system to the utility wires. The electro-mechanical locking mechanism can be electrically connected to the generator interface. The electro-mechanical locking mechanism can be configured to lock the door to the generator connection compartment if the building electrical system and the generator interface are electrically connected through the transfer switch and the door is in the closed position.

In different examples, components of the electrical docking station can have a variety of attributes. The generator connection compartment and the utility connection compartment can be positioned side by side in the cabinet. In some examples, the cabinet may include a main section and a lower section. In such examples, the main section can house the transfer switch. In such examples, the generator connection compartment and the utility connection compartment can be in the lower section. In some examples, the generator interface can include one or more connection receptacles, with each connection receptacle being configured to receive a connector and cable from the generator. In such examples, the generator connection compartment can include a bottom surface with one or more cable slots, with each cable slot having a width that allows the cable to pass through the cable slot but prevents the connector from passing through the cable slot. The generator interface may be positioned at an angle that is non-perpendicular with a back side of the cabinet. In some examples, the cabinet includes a riser connected to an interior surface of the cabinet. In such examples, the riser may be adjustable relative to the interior surface of the cabinet to accommodate hardware of various sizes.

In different examples, the electrical docking station may include additional components. In some examples, the electrical docking station may include a power supply electrically connected between the generator interface and the electro-mechanical locking mechanism. In such examples, the power supply may be configured to convert high-voltage AC input power from the generator interface to DC output power and to send converted generator power to the electro-mechanical locking mechanism. In some examples, the electrical docking station may include an alarm connected to the cabinet. In such examples, the alarm may be configured to provide an alert (e.g., an audible signal, a visual signal, both an audible signal and a visible signal, etc.) if the building electrical system and the generator interface are electrically connected through the transfer switch and the door to the generator connection compartment is in the open position.

In some examples, a method can include various steps. The method may include providing an electrical docking station (e.g., like those discussed herein). The electrical docking station can have a cabinet that includes a generator connection compartment and a utility connection compartment. The generator connection compartment may include a door movable between an open position and a closed position. The utility connection compartment can house utility wire. The electrical docking station can have a generator interface that is housed in the generator connection compartment and that is electrically connected to a generator. The electrical docking station can have a transfer switch housed in the cabinet and electrically connected to the generator interface. The transfer switch may be electrically connected to the utility wires and to a building electrical system. The electrical docking station can have an electromechanical locking mechanism electrically connected to the generator interface. In some examples, the electrical docking station may include a power supply electrically connected between the generator interface and the electro-mechanical locking mechanism. In such examples, the power supply can convert high-voltage AC input power from the generator interface to DC output power and send converted generator power to the electro-mechanical locking mechanism. The method may include switching, with the transfer switch, (i) from electrically connecting the building electrical system to the utility wires (ii) to electrically connecting the building electrical system to the generator interface. In some examples, the method includes switching, with the transfer switch, from a first state (e.g., electrically connecting the building electrical system to the utility wires) to a second state (e.g., electrically connecting the building electrical system to the generator interface). The method may include locking, with the electro-mechanical locking mechanism, the door to the generator connection compartment when the building electrical system and the generator interface are electrically connected through the transfer switch and the door is in the closed position.

In different examples, the method may include additional steps. The method may include switching, with the transfer switch, (i) from electrically connecting the building electrical system to the generator interface (ii) to electrically connecting the building electrical system to the utility wires. In some examples, the method includes switching, with the transfer switch, from one state (e.g., electrically connecting the building electrical system to the generator interface) to another state (e.g., electrically connecting the building electrical system to the utility wires). The method may include unlocking, with the electro-mechanical locking mechanism, the door to the generator connection compartment when the building electrical system and the utility wires are electrically connected through the transfer switch. In some examples, the method may include switching, with the transfer switch, from the from electrically connecting the building electrical system to the utility wires to electrically connecting the building electrical system to the generator interface automatically upon detection that now power is coming from the utility wires. In some examples, the method may include automatically switching, with the transfer switch, upon detection that power is coming from the utility wires, (i) from electrically connecting the building electrical system to the generator interface (ii) to electrically connecting the building electrical system to the utility wires. The method may include connecting a load bank to the generator interface and applying an ancillary load with the load bank. The method may include providing an alert (e.g., an audible signal, a visual signal, or both) if the building electrical system and the generator interface are electrically connected through the transfer switch and the door to the generator connection compartment is in the open position.

An electrical docking station with such features can provide a variety of advantages over conventional electrical docking stations. Current industry standards require access doors to generator connectors to be lockable. Cabinet embodiments discussed in this document will prompt the user with the alarm to close the hinged lower door and automatically lock the access door to the generator connectors when the access door is closed. This eliminates the risk of accidental sparking or arcing, for instance, if the connectors are disconnected while the generator is still energizing the electrical docking station. Having hinged access doors prevents the need to remove and set down or pick up and install access panels. Contrary to front-to-back positioning, side-by-side positioning of the utility power and generator power connectors and wires allows easy access for setup, maintenance, and repair without going through wiring of one to reach the other that is behind it. Several other advantages will be apparent to those skilled in the art.

The details of one or more examples are set forth in the accompanying drawings and the description below. Other features, objects, and advantages will be apparent from the description and drawings.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and provides some practical illustrations and examples. Those skilled in the art will recognize that many of the noted examples have a variety of suitable alternatives. A number of various exemplary electrical docking stations are disclosed herein using the description provided as follows in addition to the accompanying drawings. Each of the embodiments disclosed herein can be employed independently or in combination with one or more (e.g., all) of the other embodiments disclosed herein.

Figure 1:
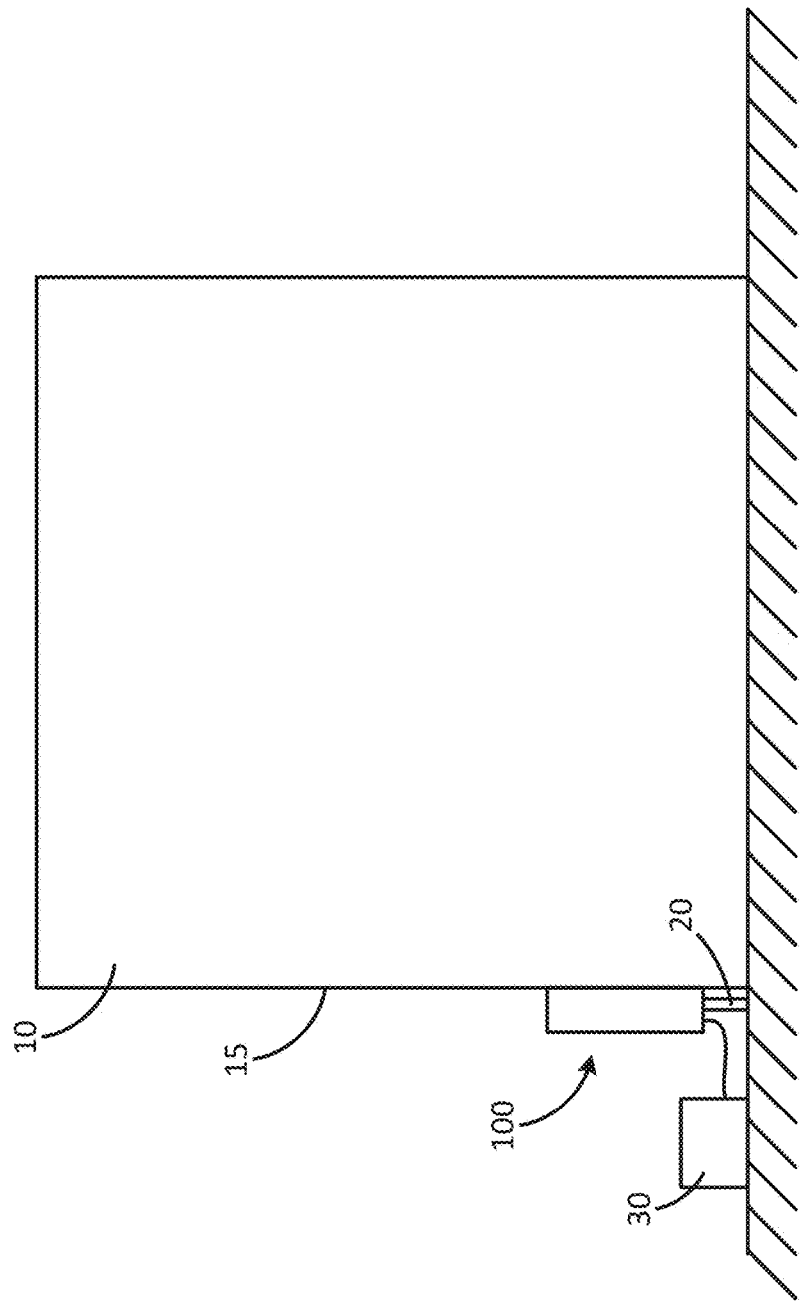
FIG. 1 is a schematic front elevational view of an illustrative electrical docking station mounted to the exterior wall of a building and connected to a generator, utility power, and the electrical system of the building.

An illustrative electrical docking station 100 as shown in FIG. 1 can supply power to a building 10 even during a power outage. The electrical docking station 100 can be wired into an electrical system of a building 10, for example, from the exterior wall 15 of the building 10. The electrical docking station 100 can be connected to a utility power line 20 and a generator 30. The generator 30 can be permanent or temporary. During normal operation, the electrical docking station 100 can output utility power to the electrical system of the building 10. In the event that utility power is shut off (e.g., due to a power outage), the electrical docking station 100 can output power from the generator 30 to the electrical system of the building 10.

Figure 2:
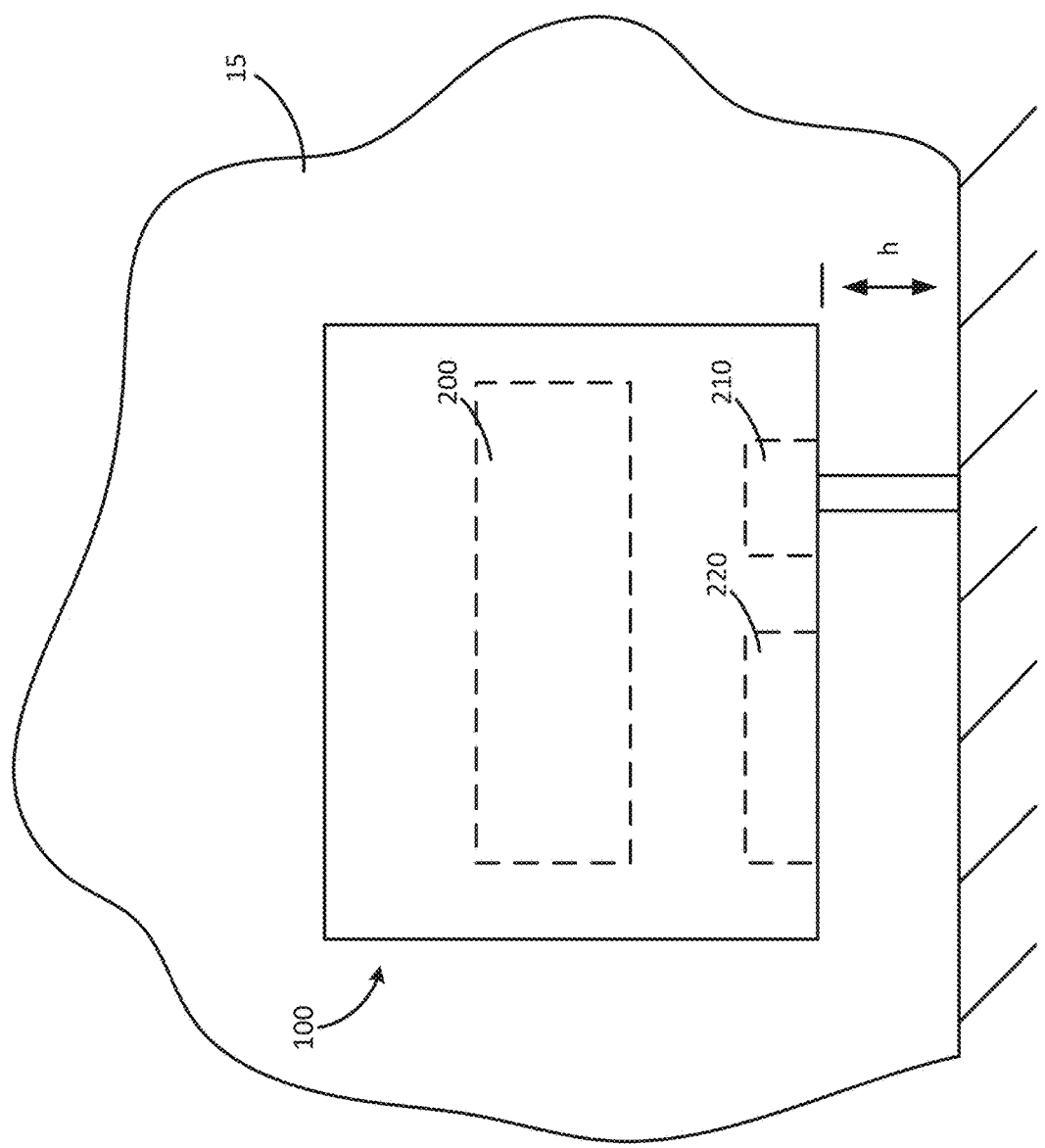
FIG. 2 is a partial, front elevational view of an illustrative electrical docking station mounted to the exterior wall of a building.

The electrical docking station 100 may provide easy access to components of the electrical docking station 100 and hardware 200 in the electrical docking station 100 as shown in FIG. 2. The electrical docking station 100 can be mounted at an exterior wall 15 of a building 10, e.g., using fasteners positioned within the periphery of the electrical docking station 100, at a readily accessible height, "h," from the ground. The utility power input 210 can be positioned beside the generator power input 220 in a direction that is generally parallel with the exterior wall 15 of the building 10 to provide easy access to wiring from either input 210, 220. The hardware 200 and inputs 210, 220 can be accessible from at least the front of the electrical docking station 100.

Figure 3:
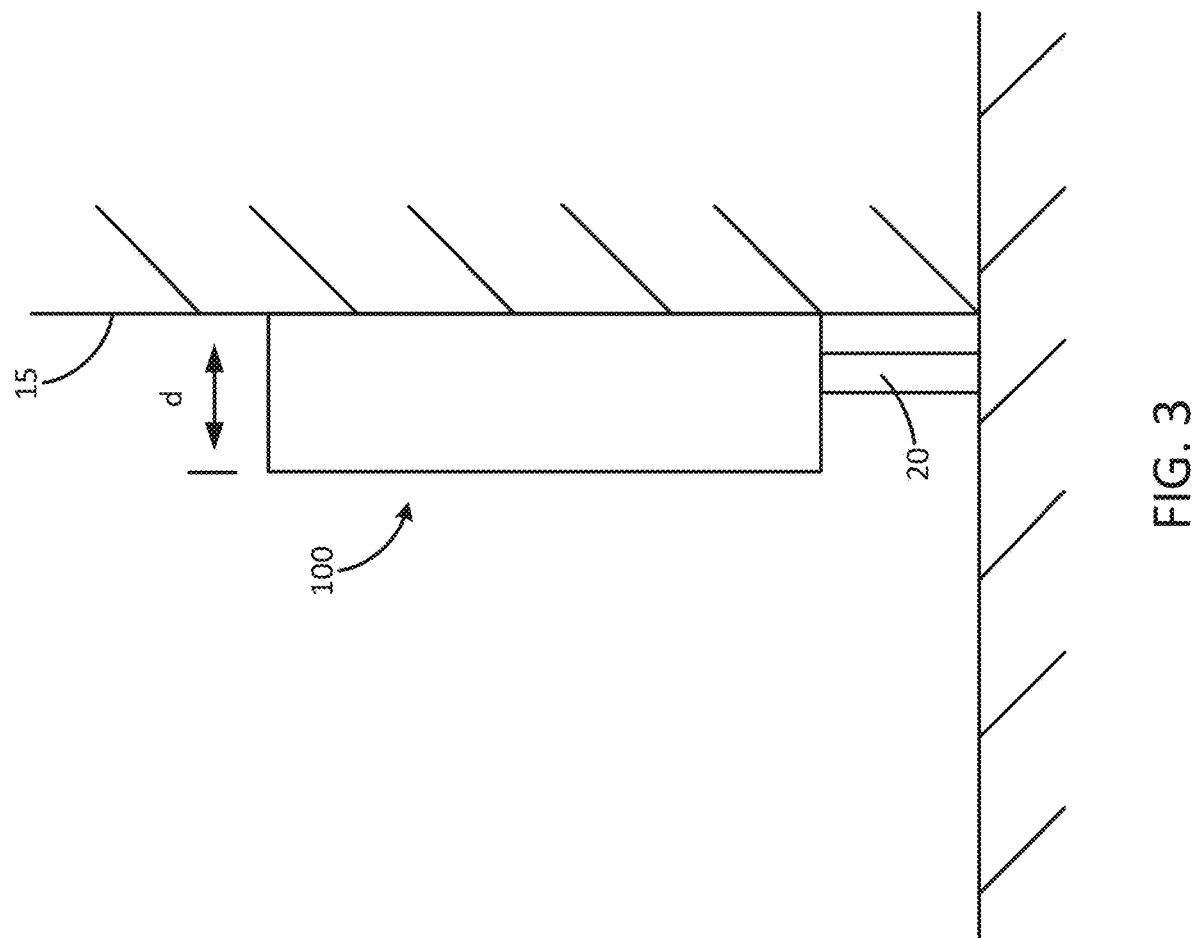
FIG. 3 is a partial, side elevational view of an illustrative electrical docking station mounted to the exterior wall of a building.

The electrical docking station 100 can minimize the depth, "d," of the electrical docking station 100 and, thus, the distance, "d," the electrical docking station 100 extends beyond the position of the exterior wall 15 as shown in FIG. 3. Less depth of the electrical docking station 100 is required when the utility power input and the generator power are positioned side by side as described above instead of front to back in the direction perpendicular to the outer wall. Other components, including the hardware within the electrical docking station 100, can be vertically disposed within the electrical docking station 100. For example, operating hardware that facilitates switching between utility power and generator power can be located above the utility power input and generator power input. Monitoring and safety hardware can be located above the operating hardware. Less depth of the electrical docking station 100 is desirable to eliminate bulkiness of the electrical docking station 100 and, e.g., the use of supportive legs required for electrical docking stations of greater depth.

Figure 4:
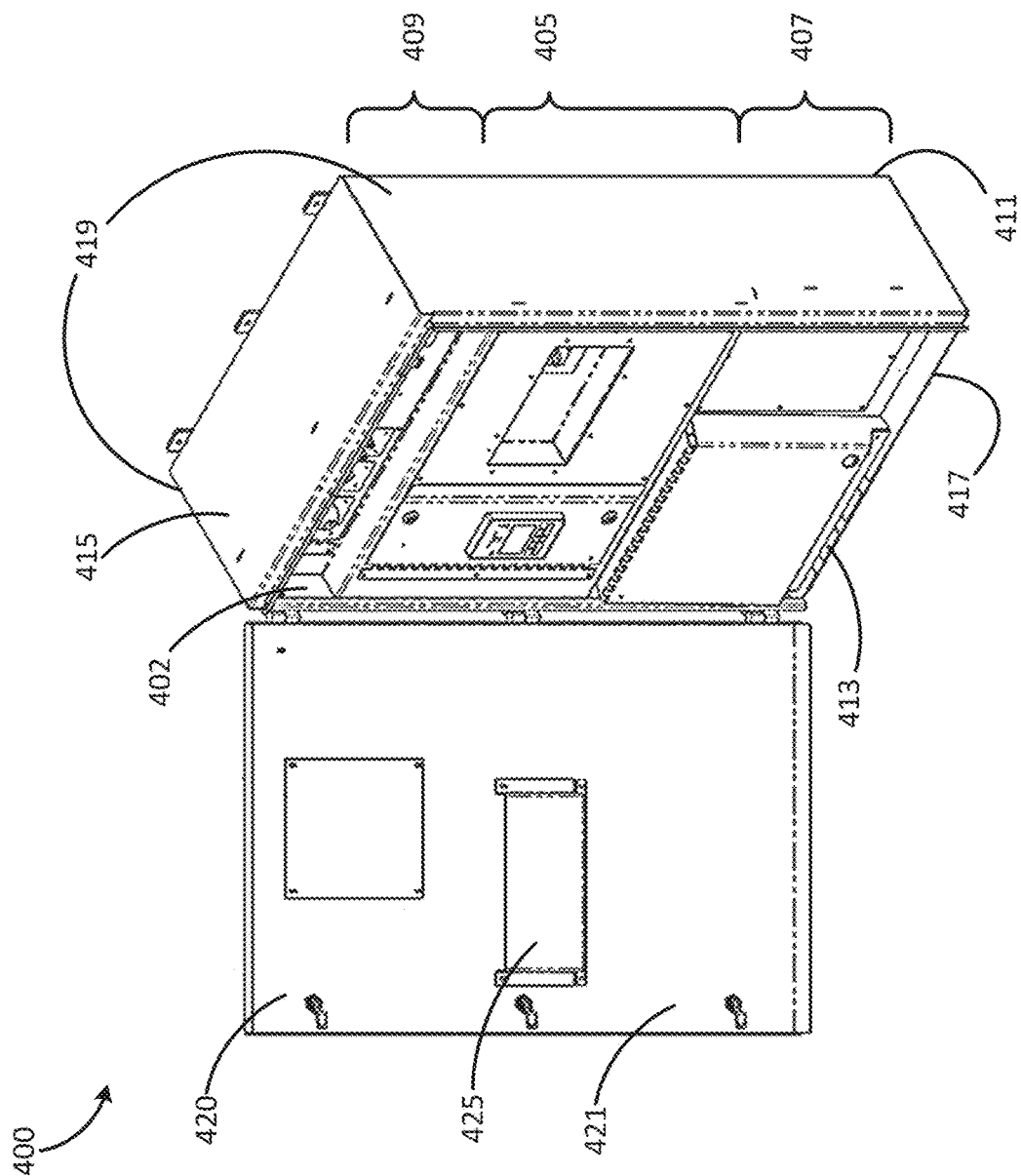
FIG. 4 is a perspective view of an illustrative electrical docking station that is a cabinet.

In many embodiments, as shown in FIG. 4, the electrical docking station can be a cabinet 400. In some embodiments, the cabinet 400 may be made of a metal material. The cabinet 400 can have a main section 405, a lower section 407 located beneath the main section 405, and an upper section 409 located above the main section 405. The cabinet 400 can have a back side 411 and a front side 413 opposing the back side 411. The cabinet 400 can have a top 415, a bottom 417, and lateral sides 419 extending between the front side 413 and the back side 411, together defining a cabinet interior 402. The upper section 409 of the cabinet 400 can include the cabinet top 415, and the lower section 407 of the cabinet 400 can include the cabinet bottom 417.

The cabinet 400 can include an outer door 420 flanking the upper section 409, the main section 405, and the lower section 407 of the cabinet 400. When closed, the outer door 420 can conceal the upper section 409, the main section 405, and the lower section 407 of the cabinet 400. When opened, the outer door 420 can reveal the upper section 409, the main section 405, and the lower section 407 of the cabinet 400. In many instances, the outer door 420 can include an outer door tray 425 attached to an inner surface 421 of the outer door 420, e.g., for storing different mediums.

Figure 5:
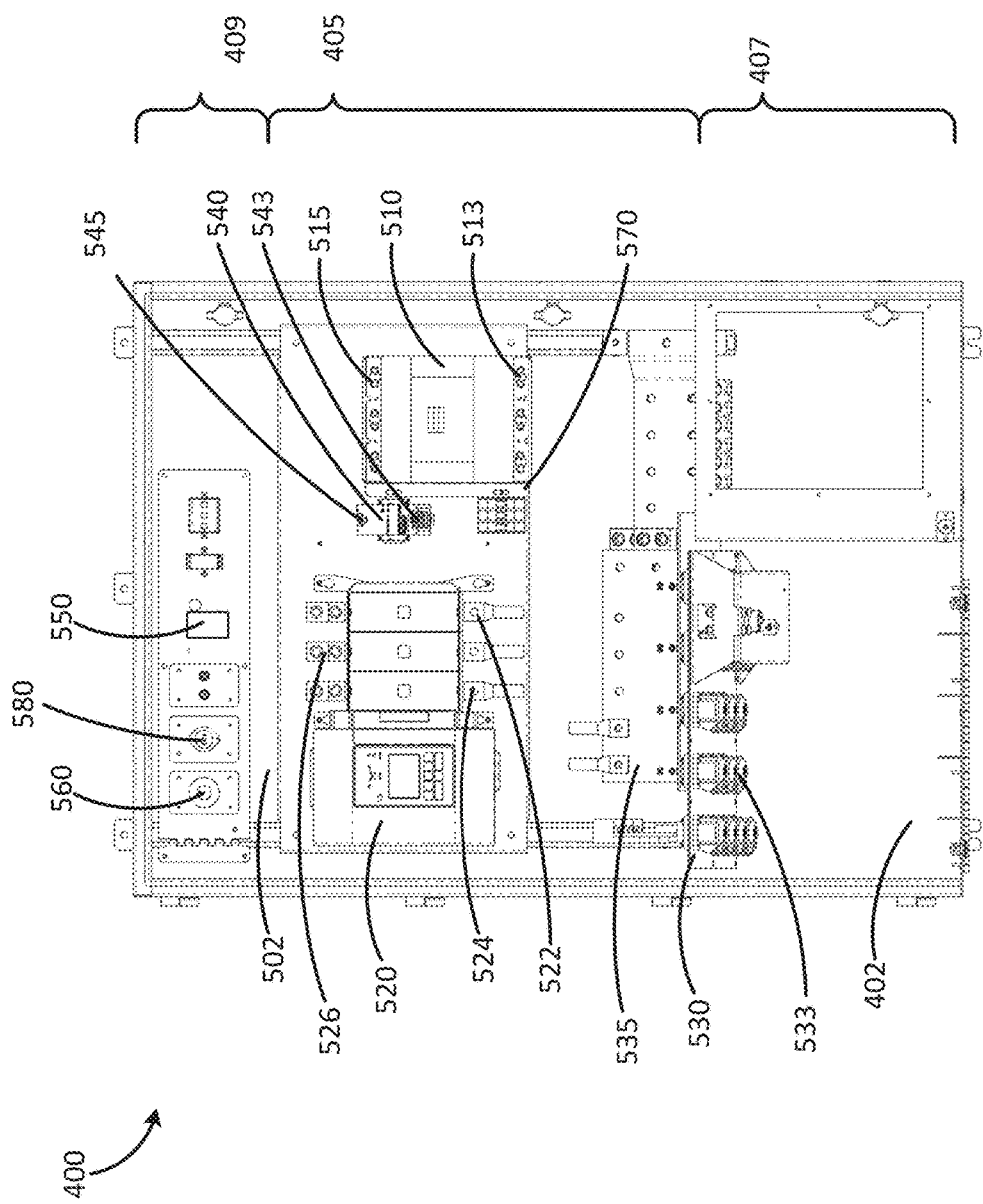
FIG. 5 is a cutaway, front elevational view of an illustrative cabinet without the outer door, the upper section cover, the main section cover, or the lower section cover.

The cabinet 400 may house electrically connected hardware within the cabinet interior 402 as shown in FIG. 5. For example, hardware may include a circuit breaker 510, an ATS 520, and a generator interface 530, each mountable to the cabinet 400. The circuit breaker 510 can, as a safety measure, stop the flow of current from the utility power in the electric circuit. An input side 513 of the circuit breaker 510 can receive utility power from wiring fed through a conduit as further discussed below. The output side 515 of the circuit breaker 510 can send utility power to a utility-power input 522 of the ATS 520. An input side 533 of the generator interface 530 can receive power through wiring from a generator as further discussed below. An output side 535 of the generator interface 530 can send generator power to a generator-power input 524 of the ATS 520, which may be positioned in front or behind the utility-power input 522, and to a generator-power input 543 of the power supply 540. A power-output side 526 of the ATS 520 can send either generator power or utility power to an electrical load such as a building's electrical system.

In many embodiments, the cabinet 400 can efficiently support load banking for testing, servicing, or protecting the permanent or temporary generator. Instead of hardwiring the load bank into a building's electrical system, an electrical docking station can include quick connectors for connecting to the load bank and other equipment. For instance, a temporary generator can be connected to the input side 533 of the generator interface 530, e.g., via male cam lock receptacles. A load bank can be connected to the input side 533 of the generator interface 530, e.g., via female cam locks receptacles, to provide an ancillary load on hardware in the cabinet 400. In many instances, the portable generator and/or the load bank can be simultaneously connected to the electrical docking station. In these instances, an interlocking system (e.g., a kirk key system) may be used to transfer power between the permanent and temporary generator. Once connected, the load bank can gradually apply an ancillary load (e.g., up to 50%, 70%, or 100% of designed load capacity) on hardware in the cabinet 400.

Load banking can ensure safe and quality performance of each component in the cabinet 400 by testing them under a known load condition. Although normal operation of the temporary generator operates at less than 100% of the designed load capacity, load banking can induce a substantial load condition (e.g., 50%, 70%, or 100% of designed load capacity) on hardware in the cabinet 400 to ensure all components of the cabinet 400 are tested, especially those designed to be used at high-load capacity. Load banking can introduce load conditions not typically seen during normal operation to verify overall generator performance and help detect causes of failure such as coolant issues, radiator issues, and wet stacking. The cabinet 400 can include a load dump 580 for use during load banking to protect a permanent generator from overload while the permanent generator is supplying load to a building's electrical system during an actual utility power failure.

The ATS 520 in the cabinet 400 can send either high-voltage utility power or high-voltage generator power from the electrical docking station out to the building. The ATS 520 can be biased to send utility power to the building and switch either manually to generator power or automatically to generator power in the event that utility power is not received at the ATS 520 while generator power is received at the ATS 520. The ATS 520 can switch from outputting generator power to outputting utility power once utility power is restored and received at the ATS 520, in the event that generator power is not received at the ATS 520, or if the ATS 520 is manually switched from generator power to utility power.

In many embodiments, the hardware may include a power supply 540, a SCADA control system 550, and/or an alarm 560. The power supply 540 can convert high-voltage AC input power from the output of the generator interface 530 to DC current output (e.g., 5 A, 120 W, 480 VAC, 3-phase nominal input to an adjustable 24 VDC output). The converted-power output side 545 of the power supply 540 can send converted generator power to certain hardware in the cabinet 400, e.g., the alarm 560 and a locking mechanism as further described below. The overcurrent protection for the power supply 540 can protect the power supply 540, the alarm 560, a phase rotation meter, a monitor, etc. from overcurrent in some instances.

The main section 405 of the cabinet 400 can house several pieces of hardware within the cabinet 400. Many embodiments of the cabinet 400 may have the ATS 520, the circuit breaker 510, and the power supply 540 in the main section 405 of the cabinet 400. These and other components can be optimally positioned within the main section 405 of the cabinet 400 (e.g., using an adjustable riser as further discussed below) to facilitate access to hardware, accommodate cable bending radii, and facilitate optimal performance, among other things.

The ATS 520 can be positioned in the main section 405 of the cabinet 400 such that it can be readily accessible from an upper section cover in the upper section 409 of the cabinet 400 and/or a main section cover in the main section 405 of the cabinet 400 as described below. In some embodiments, as noted above, the utility-power input 522 may be positioned coplanar and/or in front of or behind the generator-power input 524 of the ATS 520. The power-output side 526 of the ATS 520 may be accessible from the upper section cover, and the utility-power input 522 and the generator-power input 524 of the ATS 520 may be accessible from the main section cover. In some embodiments, the ATS 520 may be accessible from the lower section 407 of the cabinet 400.

An adjustable riser 570 shown in FIG. 5 may be included in the main section 405 of the cabinet 400 to position hardware within the main section 405 of the cabinet 400. The adjustable riser 570 can be adjustable relative to the interior surface 502 of the back side 411 of the cabinet 400 to accommodate hardware of various sizes. Though listed below in specific combinations, one skilled in the art can appreciate that the circular fastening holes and the elongate fastening holes may be reversed in some embodiments. Likewise, elongate holes can be formed in different directions to accommodate adjustments in any particular direction.

Figure 6A:
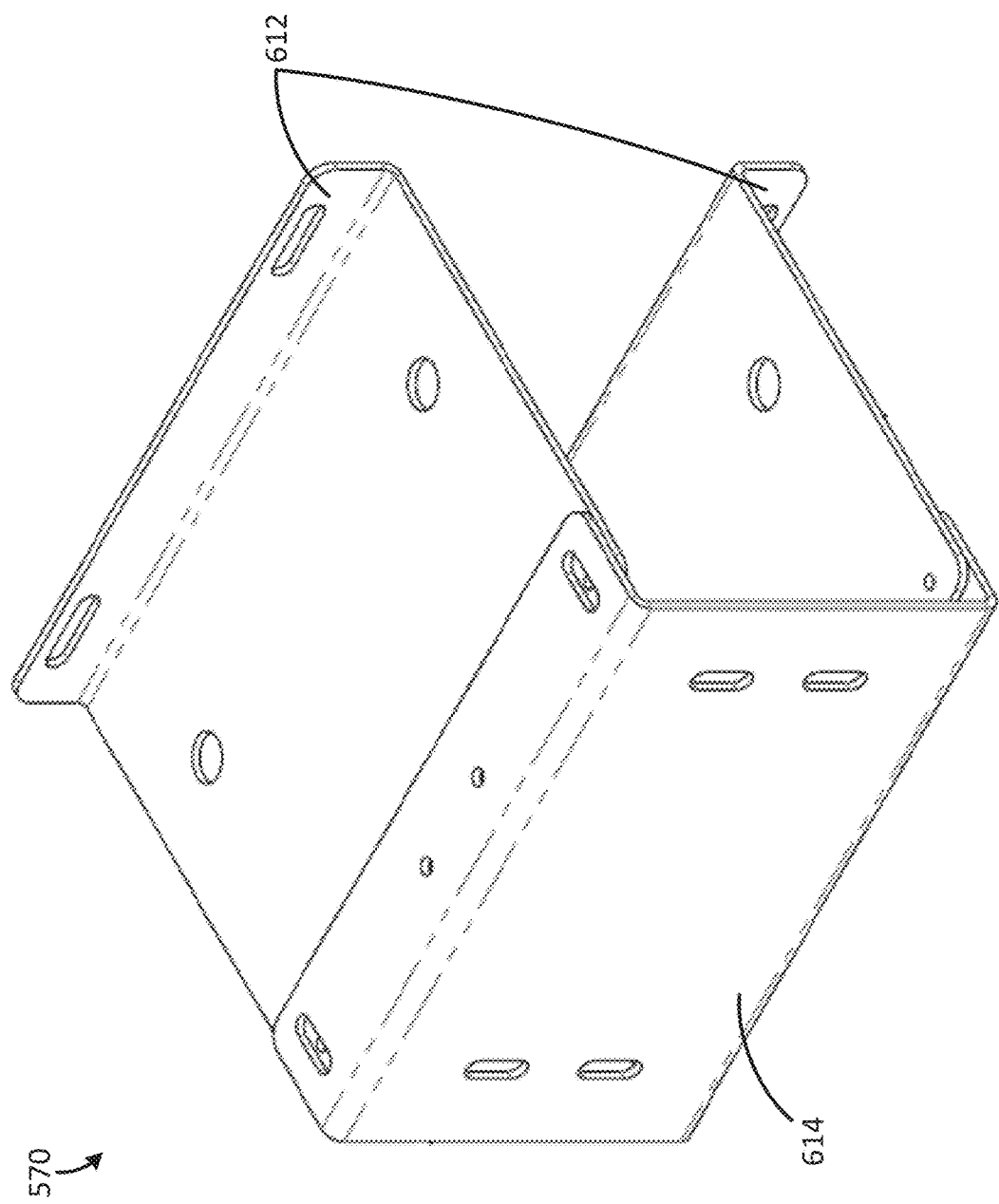
FIG. 6A is a perspective view of an illustrative adjustable riser.

The adjustable riser 570 seen in FIG. 6A can be connected to an interior surface of the back side of the cabinet. The adjustable riser 570 can include lateral flanges 612 connectible to the back side of the cabinet and an equipment seat 614 connected to the end of the lateral flanges 612 that is distal from the back side of the cabinet. The equipment seat 614 can support various types of hardware. Many embodiments may have the circuit breaker supported by the adjustable riser 570 at the equipment seat 614.

Figure 6C:
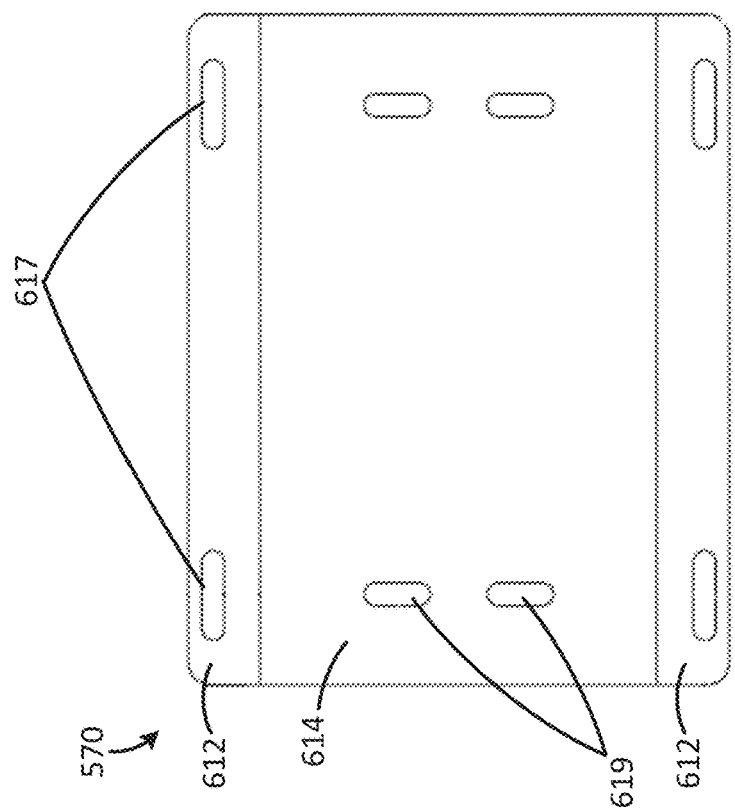
FIG. 6C is a top elevational view of an illustrative adjustable riser.
Figure 6B:
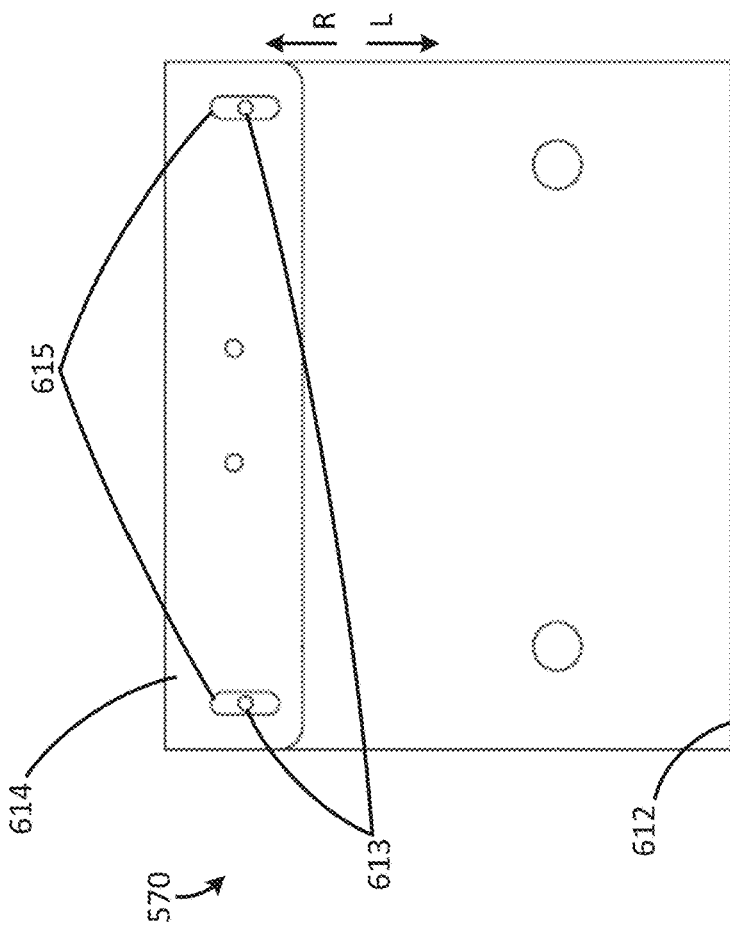
FIG. 6B is a side elevational view of an illustrative adjustable riser.

As shown in FIG. 6B, the adjustable riser 570 can be lowered (moved in direction, "L") to accommodate taller hardware and raised (moved in direction, "R") to accommodate shorter hardware. The equipment seat 614 can have seat elongated fastening holes 615 aligning with flange circular fastening holes 613 in the lateral flanges 612. The seat elongated fastening holes 615 may be elongated in the direction perpendicular to the back side of the cabinet. The equipment seat 614 can be adjusted by positioning the seat elongated fastening holes 615 at a desired position over the flange circular fastening holes 613 and fastening the equipment seat 614 to the lateral flanges 612.

Similarly, as shown in FIG. 6C, the adjustable riser 570 can be adjusted in the direction parallel to the width of the cabinet. In some embodiments, flange elongated fastening holes 617 may be at the end of the lateral flanges 612 that is proximal to the interior surface of the back side of the cabinet and the circular fastening holes may be in the back side of the cabinet. The lateral flanges 612 can be adjusted by positioning the flange elongated fastening holes 617 at a desired position over the circular fastening holes and fastening the lateral flanges 612 to the back side of the cabinet.

The position of the hardware on the equipment seat 614 can be adjusted in the direction parallel to the height of the cabinet. In some embodiments, equipment elongated fastening holes 619 may be disposed in the equipment seat 614 and the circular fastening holes may be in the hardware. The hardware can be adjusted by positioning the equipment elongated fastening holes 619 at a desired position over the circular fastening holes and fastening the equipment seat 614 to the hardware.

As may be appreciated, the adjustable riser 570 may bring a portion of the hardware to an interface port in the main section cover as further described below. In some such instances, a portion of the hardware, such as a switch, can protrude through the main section cover for ease of access. Thus, a user may readily interface with the hardware at the front of the cabinet.

Figure 7:
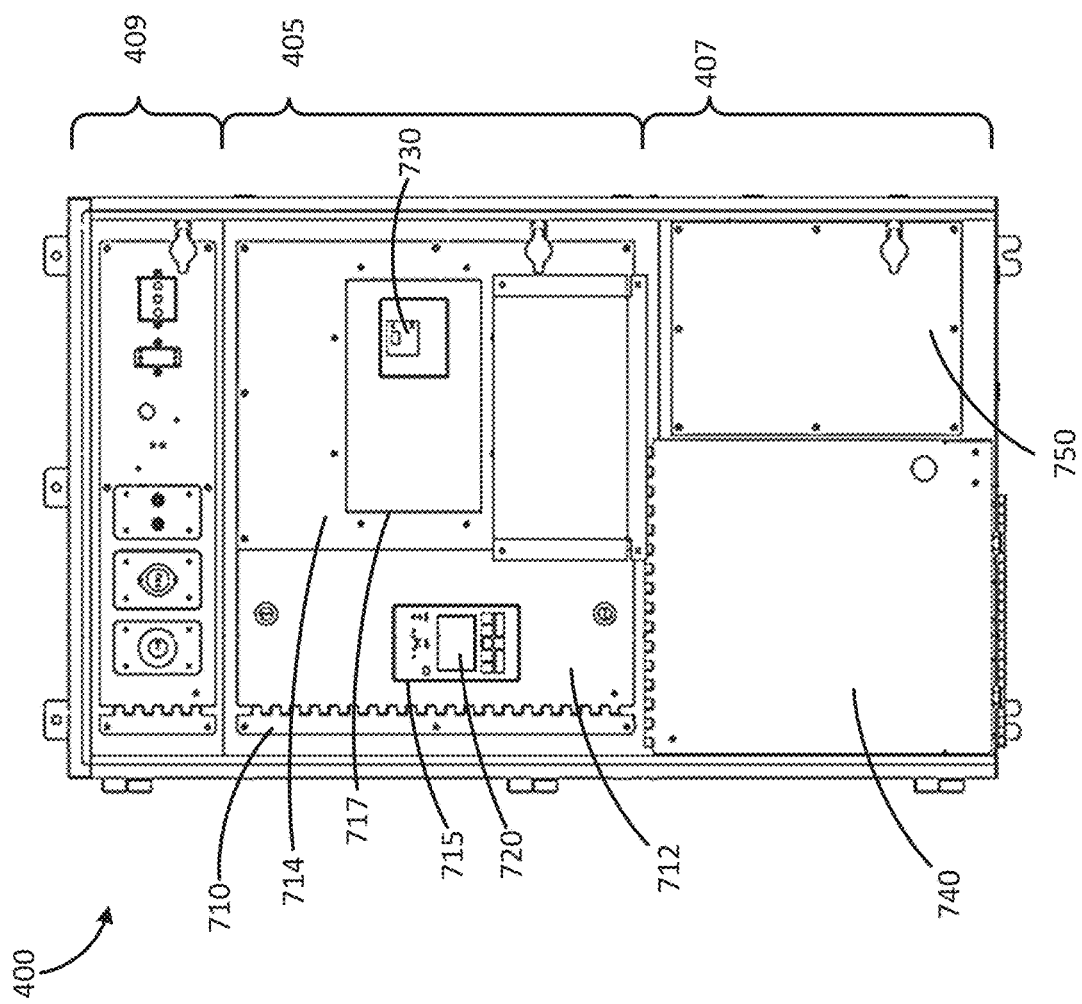
FIG. 7 is a cutaway, front elevational view of an illustrative cabinet without the outer door.

The main section 405 of the cabinet 400 can conceal several pieces of hardware within the cabinet 400 as shown in FIG. 7. The main section 405 of the cabinet 400 may include a main section cover 710. Many instances of the main section cover 710 may be a hinged middle door 712. The main section cover 710 may, in some embodiments, include hinged middle doors flanking both sides of the main section 405. The main section cover 710, in some instances, may include a hinged middle door 712 and a dead front cover 714. In some embodiments, the dead front cover 714 is hingably connected to the main section 405 of the cabinet 400.

The main section cover 710 can include ports to access portions of the hardware housed in the main section 405 of the cabinet. For example, the main section cover 710 can include an interface port 715 for a user interface 720. The interface 720 in some embodiments can be connected to the ATS and either analog or digital. The interface 720 may display information about the ATS and/or electrical docking station and control manual switching between generator power and utility power among other functions of the ATS. In some instances, the main section cover 710 can include a circuit breaker port 717 to access a circuit breaker switch 730 which, for example, can toggle between on, off, and tripped positions.

The lower section 407 of the cabinet 400 can be beneath the middle 405 section of the cabinet 400. The lower section 407 of the cabinet 400 may include a generator connection compartment 740 and a utility connection compartment 750. As discussed above, the generator connection compartment 740 can be laterally positioned (e.g., side by side) with respect to the utility connection compartment 750. In some embodiments, the generator connection compartment 740 and the utility connection compartment 750 may share a common side.

Figure 8:
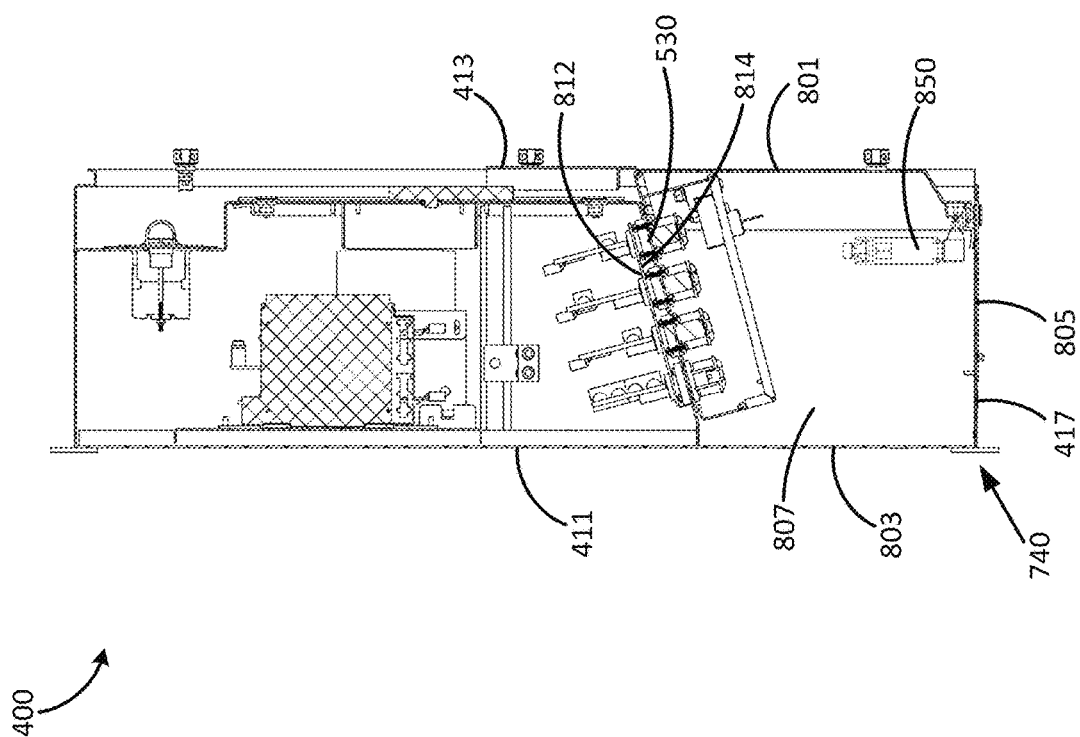
FIG. 8 is a side elevational cross-section view of an illustrative cabinet.

The generator connection compartment 740 can house the generator interface 530 as shown in FIG. 8. The generator connection compartment 740 can include a front side 801, a back side 803, a bottom side 805, and lateral sides 807 extending between the front and back sides 801, 803. The bottom side 805 of the generator connection compartment 740 can be coincident with the bottom surface 417 of the cabinet 400.

A user can connect the generator to the electrical docking station through the generator connection compartment 740. The generator interface 530 can be positioned near the top of the generator connection compartment 740. The generator interface 530 can be positioned to facilitate connecting cables to the generator interface 530 and to promote connector safety.

Many embodiments may have the generator interface 530 positioned at an angle that is non-perpendicular with the back side 411 of the cabinet 400. The generator interface 530 can include an upper surface 812 and a lower surface 814 opposing the upper surface 812. In some instances, the upper surface 812 of the generator interface 530 can extend upward at an acute angle with the back side 411 of the cabinet 400. A generator interface 530 at such a position is easier to connect cable to from the front side 413 of the cabinet 400 and can prevent accidental pullouts of the connectors if they are pulled straight down (e.g., during setup or by accident).

Figure 9:
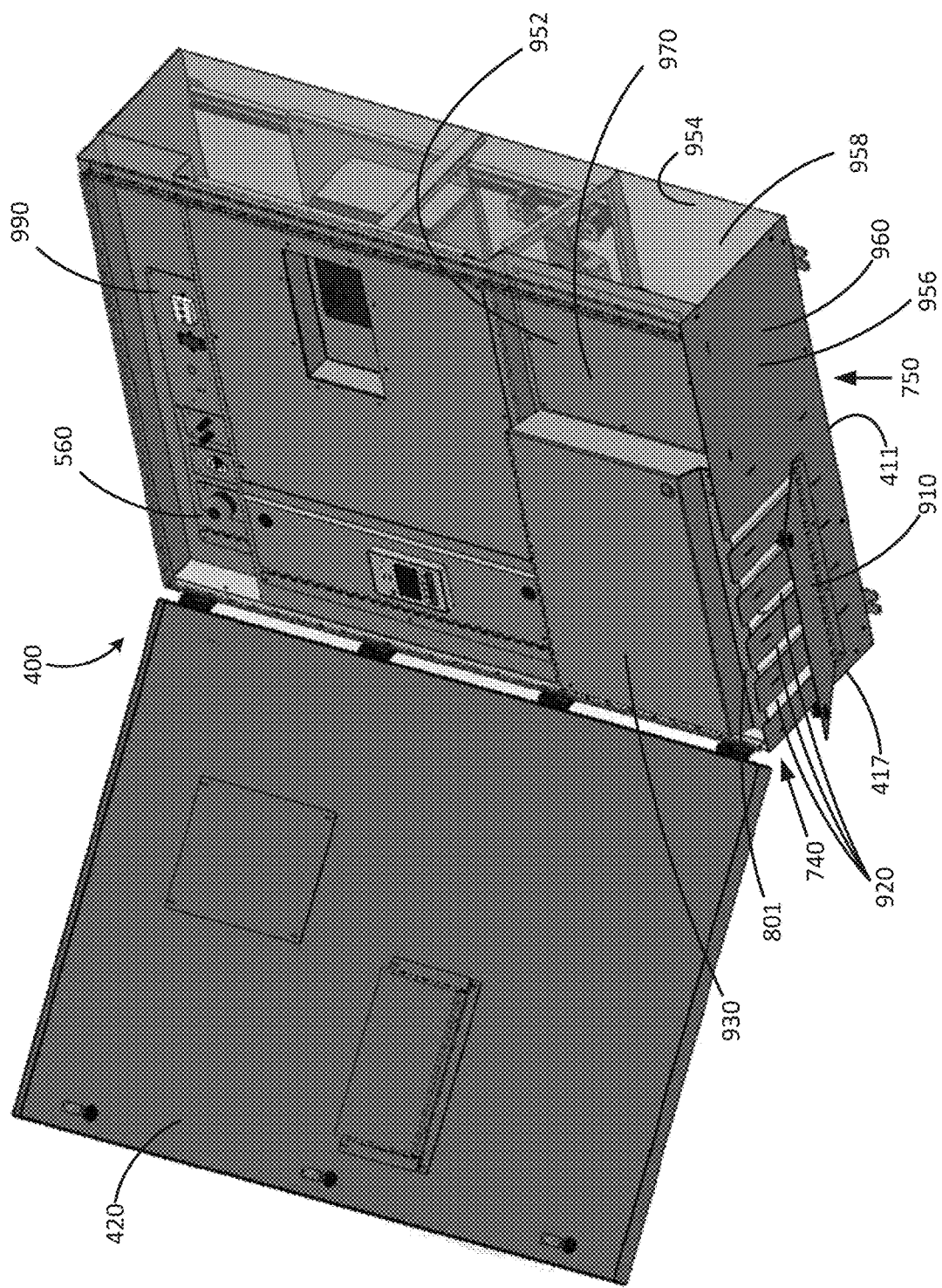
FIG. 9 is a perspective view of an illustrative cabinet with the outer door open and the bottom access door ajar.

A bottom access door 910 as shown in FIG. 9 may be provided at the bottom surface 805 of the generator connection compartment 740 to connect cables to the generator interface. The bottom access door 910 can be hingably connected to the bottom surface 805 of the generator connection compartment 740. The bottom access door 910 may be hinged near the back side 411 of the cabinet 400 in some instances. As a safety and theft prevention measure, the bottom access door 910 can be configured to open only after the outer door 420, hinged lower door 930, or both are opened.

The bottom surface 805 of the generator connection compartment 740 can include one or more cable slots 920 to accommodate cables in the generator connection compartment 740. The cable slots 920 can extend in the direction perpendicular to the back side 411 of the cabinet 400. The cable slots 920 can have a width sufficient to accommodate a wiring shroud surrounding a wiring bundle of generator connectors. In many embodiments, the cable slots 920 can extend to the front of the bottom surface 805 and not extend through the back of the bottom surface 805. Cables may pass through the cable slots 920 and connect to generator interface in the generator connection compartment 740. The cable slots 920 may be narrow enough to prevent cable connectors from passing through.

The front side of the generator connection compartment 740 can include a hinged lower door 930. The hinged lower door 930 can be movable between an open position and closed position. When opened, the hinged lower door 930 can reveal the generator interface. When closed, the hinged lower door 930 can conceal the generator interface.

In operation, the cabinet 400 can include access control to the generator connectors when the generator is connected to the cabinet 400 and energized. Some components of the cabinet 400 can control access through an interlocking mechanism (e.g., a kirk key system). In some embodiments, a locking mechanism can be configured to latch shut the hinged lower door 930 when the hinged lower door 930 is in the closed position. The locking mechanism can be configured to not latch shut the hinged lower door 930 when the hinged lower door 930 is in the open position.

As can be appreciated, the access control of the generator connection compartment 740 may be suitable for a variety of applications. An access-controlled compartment can be similar to those generator connection compartments 740 described elsewhere herein. The access-controlled compartment can house a connector interface and can include a front side 801, a back side, a top side, a bottom side, and lateral sides extending between the front side 801 and back side. The access-controlled compartment can include a bottom access door and a hinged front door similar to the bottom access door 910 and hinged lower door 930 of the generator connection compartment 740 respectively. An alarm similar to the alarm 560 of the generator connection compartment 740 may be included with the access-controlled compartment and configured to correspond to and alert a user of safe and/or unsafe conditions (e.g., if the hinged front door is improperly opened or closed).

Such an access-controlled compartment may be used in applications where restriction to components housed in the access-controlled compartment is desirable. For instance, the access-controlled compartment can restrict access to one or more common connection points for one or more electrical devices to prevent undesired tampering or disconnection. Similarly, for the same reasons, the access-controlled compartment may restrict access to controls, meters, or other monitoring equipment. In some instances, the access-controlled compartment can restrict access to only certain authorized individuals.

Referring back to FIG. 8, in many embodiments, the locking mechanism 850 may be an electro-mechanical locking mechanism 850. The electro-mechanical locking mechanism 850 can be a solenoid connected to the power supply. The solenoid may be designed to lock when the hinged lower door is in the closed position and the generator is energized. To increase usability, the locking mechanism 850 may be configured to latch even when mating components of the locking mechanism 850 are not perfectly aligned with each other when the hinged lower door is in the closed position. An alarm may indicate whether the hinged lower door is locked or not as further described below.

Figure 10B:
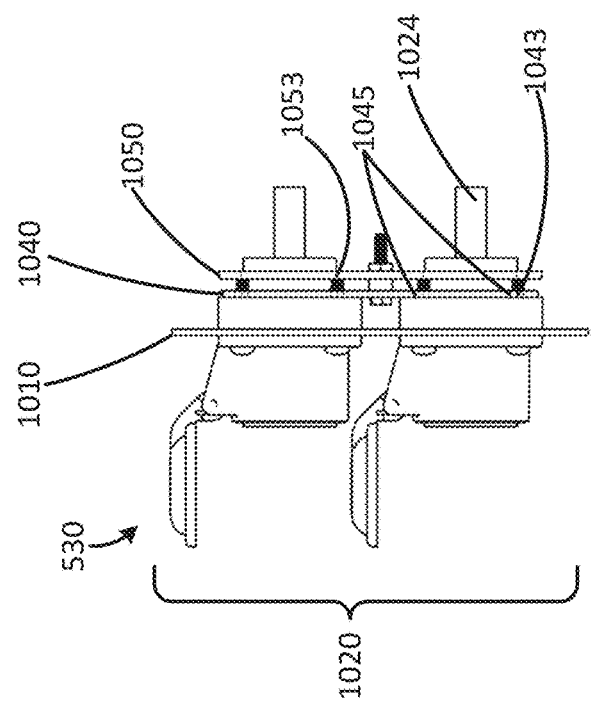
FIG. 10B is a side elevational view of an illustrative generator interface.
Figure 10A:
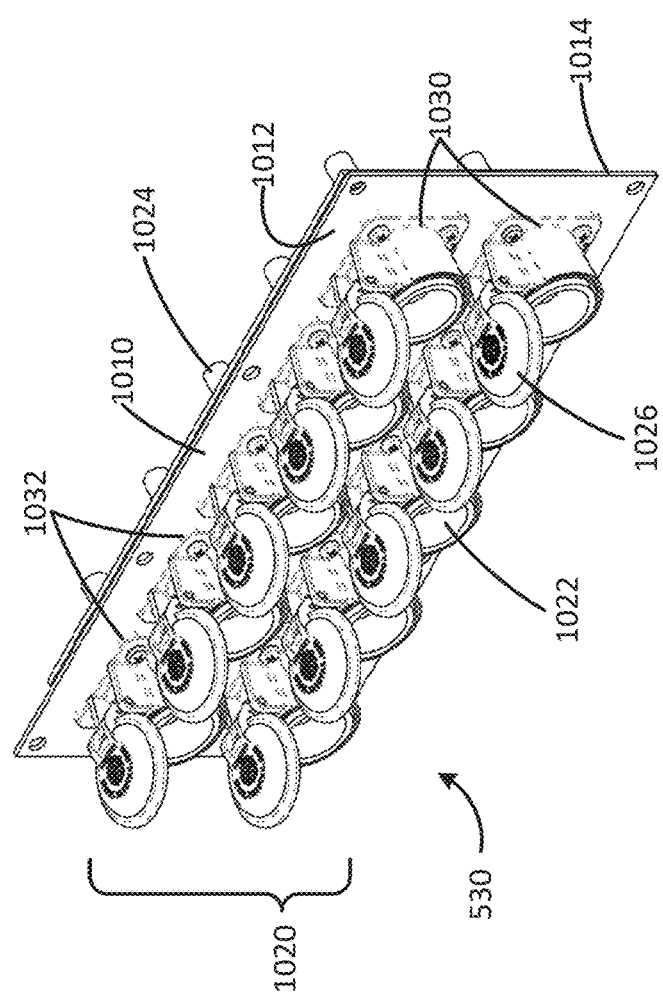
FIG. 10A is a perspective view of an illustrative generator interface.

The generator interface 530 can include a base 1010 and one or more connection receptacles 1020 as shown in FIGS. 10A and 10B. The receptacles 1020 can be received in receptacle openings 1030 provided in the base 1010 and attached to the base 1010 using receptacle fastener holes 1032 positioned about the receptacle openings 1030 as shown in FIG. 10A. The receptacle openings 1030 can be large enough to accommodate the receptacle without the receptacle passing through the receptacle opening. The receptacles 1020 can receive connectors from the generator. In many instances, the receptacles 1020 may be cam lock receptacles (e.g., either male or female cam lock receptacles). The front-side mount 1022 of the receptacles 1020 can be at the bottom surface 1012 of base 1010 of the generator interface 530 and include a protective cover 1026. The back-side mount 1024 of the receptacles 1020 can be at the top surface 1014 of base 1010 the generator interface 530 (e.g., such that the connections to the bus bar are facing towards the main section of the cabinet).

The generator interface 530 can include a retainer plate 1040 as shown in FIG. 10B. The retainer plate 1040 can fit over the receptacles 1020 in the base 1010 of the generator interface 530. The retainer plate 1040 can include retainer openings 1043 and retainer plate fastening holes 1045. The retainer plate fastening holes 1045 may align with the receptacle fastener holes 1032. The retainer plate fastening holes 1045 can, in some embodiments, be threaded. In some such embodiments, a threaded fastener can enter a bottom-surface side of the receptacle fastener hole 1032 and protrude through the threaded retainer plate fastening holes 1045 to sandwich the receptacles 1020 between the base 1010 and the retainer plate 1040.

An insulating plate 1050 can protect the back-side mount 1024 of the receptacles 1020 from creepage. For instance, the insulating plate 1050 can be positioned between an exposed end of the fastener and the back-side mount 1024 of the receptacles 1020. The insulating plate 1050 can have insulating plate holes 1053 corresponding to the position of the retainer openings 1043. The insulating plate holes 1053 can have an integral attachment feature (e.g., the insulating plate 1050 having a snap-fit to the back-side mount 1024 of the receptacles 1020). In other embodiments, the insulating plate 1050 may be otherwise separately attachable to components of the generator interface 530 or the generator interface 530 itself. In some embodiments, the insulating plate 1050 may be made of a composite material such as an electrical grade, fiberglass-reinforced thermoset polyester resin.

Referring back to FIG. 9, utility power can enter the electrical docking station through the utility connection compartment 750. Many embodiments of the utility connection compartment 750 can include a front side 952, a back side 954, a bottom side 956, and lateral sides 958 extending between the front and back sides 952, 954. Wires can enter the utility connection compartment 750 through one or more access doors or panels.

The utility connection compartment 750 can have a removable bottom access panel 960. The bottom access panel 960 can be coincident with the bottom 417 of the cabinet 400. The bottom access panel 960 can be removed to connect the circuit breaker to utility power, e.g., through a conduit extending at least to the bottom of the cabinet 400 with wires extending upwards from the bottom 417 of the cabinet 400 to the circuit breaker.

The utility connection compartment 750 can have a removable front access panel 970. The front access panel 970 can be removed, to reveal the utility connection compartment 750. For example, removing the front access panel 970 can facilitate inspecting wires or other system components such as the locking mechanism in some embodiments. In the same way, removing the front access panel 970 can facilitate making a connection to the circuit breaker.

At least a portion of some hardware in the main section can be accessible from the upper section of the cabinet through an upper section cover 990. The upper section of the cabinet may be above the main section of the cabinet and include the upper section cover 990. The upper section can be recessed in a front plane of the cabinet relative to the main section of the cabinet 400.

Figure 11A:
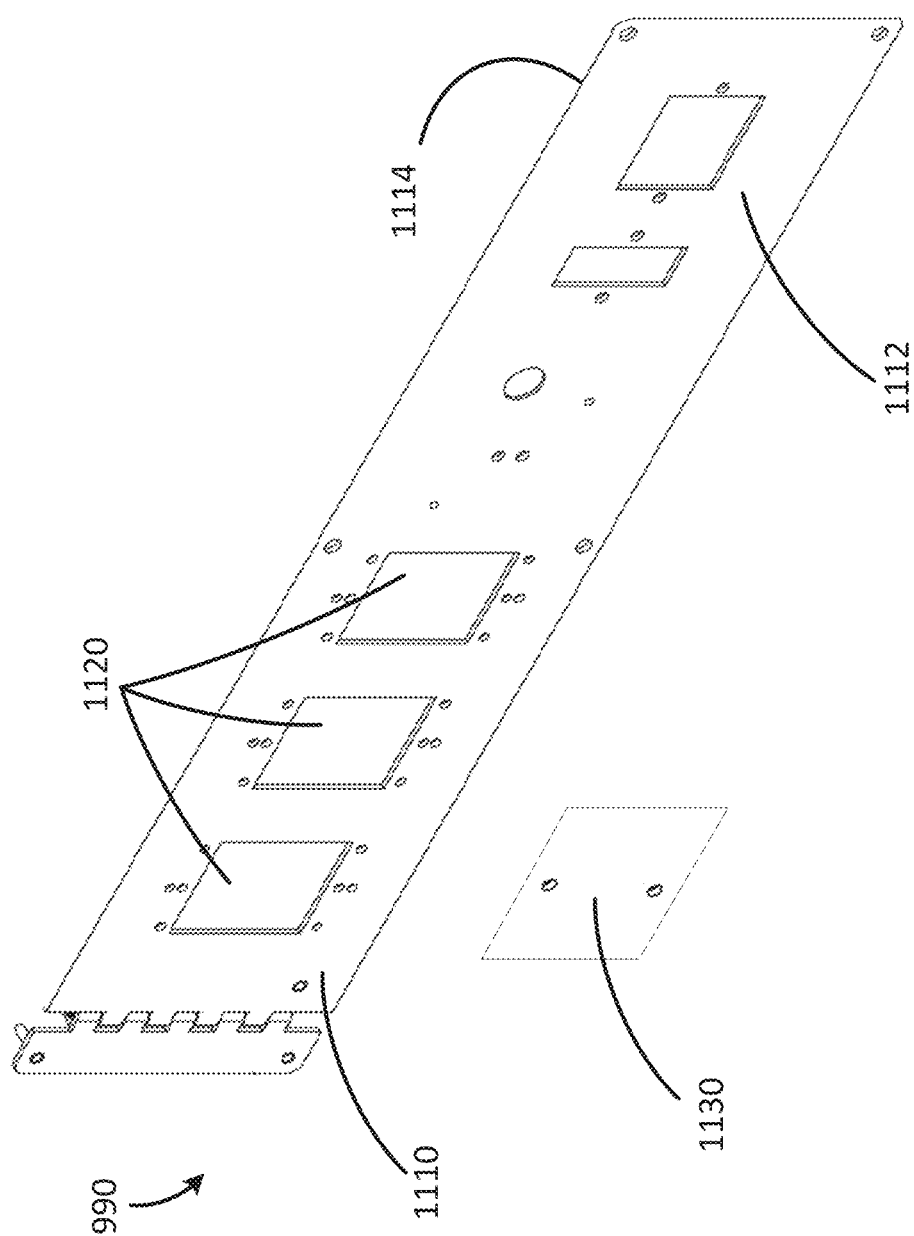
FIG. 11A is a perspective view of an illustrative aperture cover and an upper section cover that is a hinged upper door.

In many instances, the upper section cover 990 may be a hinged upper door 1110 as shown in FIG. 11A. The hinged upper door 1110 may have a front surface 1112 and a back surface 1114. Wiring to components attached to the hinged upper door 1110 can be secured to the back surface 1114 of the hinged upper door 1110 such that they do not interfere with access when the hinged upper door 1110 is opened.

The upper section cover 990 may include one or more apertures 1120 disposed in the upper section cover 990. In many instances, one or more pieces of hardware can be mounted to the upper section cover 990 in the apertures 1120 in the upper section cover 990. When no pieces of hardware are mounted in the apertures 1120, in some instances, an aperture cover 1130 may connect to the upper section cover 990 to conceal the aperture 1120. The apertures 1120 may receive hardware such as electrical sockets, connectors, computer components and systems, alarming devices (e.g., the alarm 560), electrical receptacles (e.g., the SCADA 550), switches, and accompanying covers, etc.

Figure 11B:
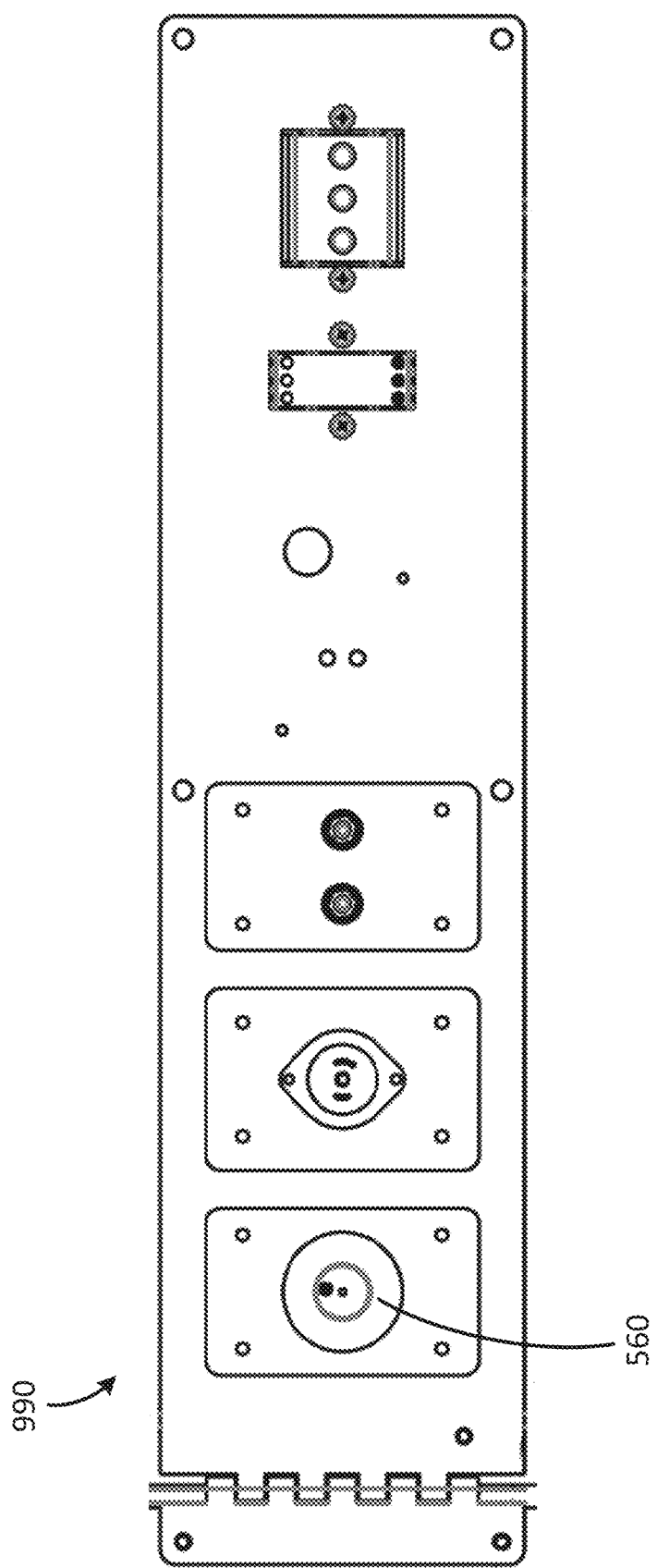
FIG. 11B is a front elevational view of an upper section cover that is a hinged upper door with hardware mounted in the aperture.

The alarm 560 shown in FIG. 11B can be configured to indicate whether the lower hinged door is locked or not. In some instances, a user may connect generator cables to the generator interface and energize the generator before closing the lower hinged door. In such instances, the generator may provide power to the electrical docking station. When generator power is being provided to the electrical docking station, but the lower hinged door is not locked, the alarm 560 can provide an audible signal or visual signal. In some examples, the alarm 560 can provide both an audible signal and visual signal. The audible signal in some embodiments can be a high-pitched noise. The visual signal in some embodiments can be a particular color. In operation, if generator power is being provided to the electrical docking station, but the hinged lower door is not locked, the alarm 560 can provide an audible signal and shine red. If, on the other hand, generator power is being provided to the electrical docking station, but the lower hinged door is locked, the alarm 560 may instead not provide an audible signal and shine green.

Figure 12:
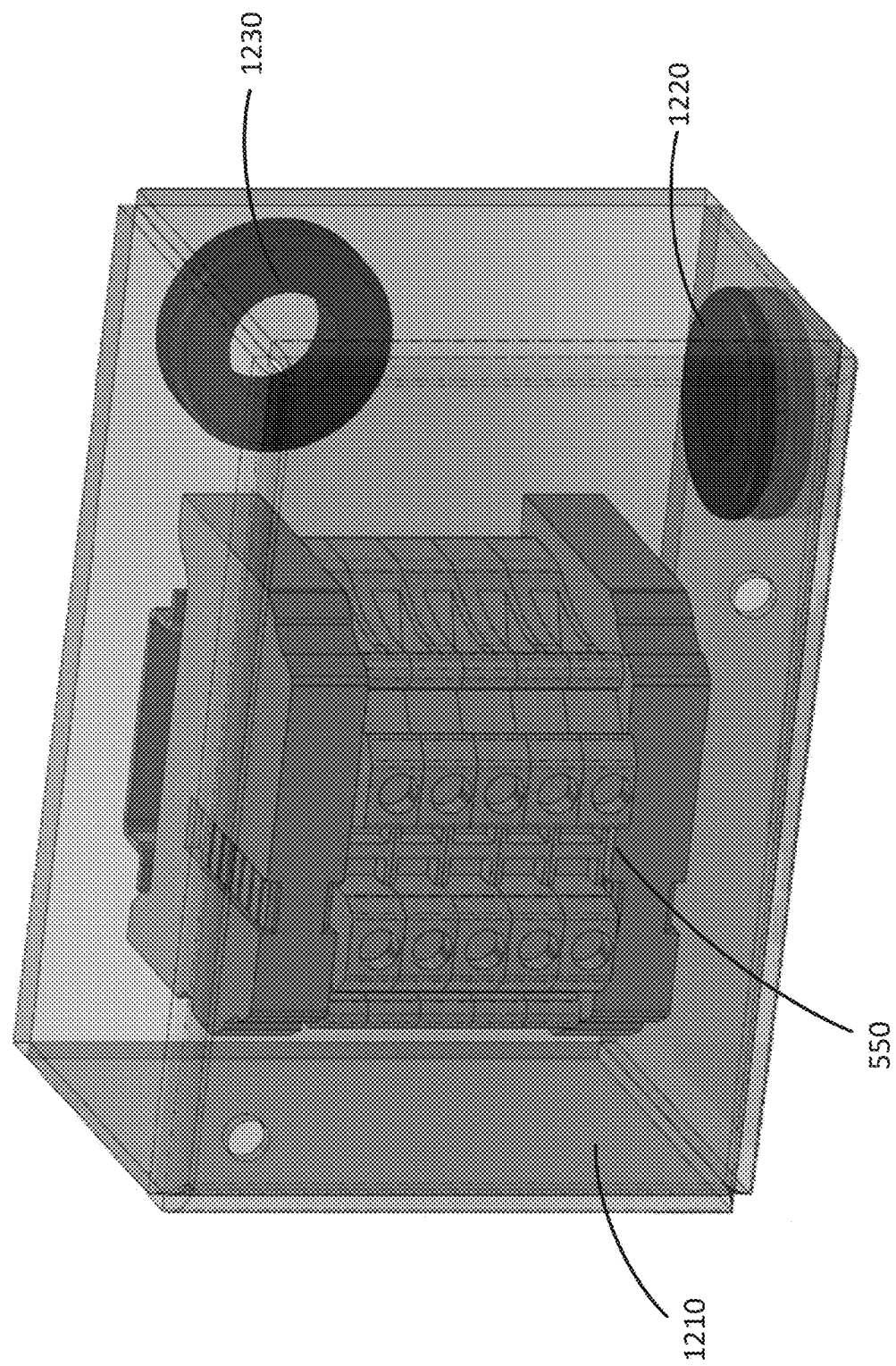
FIG. 12 is a perspective view of a supervisory control and data acquisition (SCADA) in a SCADA cover.

The generator can be connected to the SCADA 550 shown in FIG. 12 to provide generator information to the user. For instance, the SCADA 550 can be mounted to the hinged upper door enclosed in a SCADA cover 1210 and wired to the electrical docking station through a wiring grommet 1230. The SCADA cover 1210 can be a removed using a handling grommet 1220 in a bottom of the SCADA cover 1210. A generator can be electrically connected to the SCADA 550 by connecting a corresponding terminal of the generator to the SCADA 550. Generator information can include various parameters of the generator (e.g., fuel, oil pressure, run rate, etc.) monitored by the SCADA. The generator information can be outputted to the user. The SCADA 550 may receive power from the above-referenced power supply.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. An electrical docking station, comprising:
    (a) a cabinet that includes a generator connection compartment and a utility connection compartment, the generator connection compartment including a door movable between an open position and a closed position, the utility connection compartment being configured to house utility wires;
    (b) a generator interface housed in the generator connection compartment and configured to be electrically connected to a generator and to a transfer switch, the transfer switch being electrically connected to the utility wires and to a building electrical system, the transfer switch being configured to switch between electrically connecting the building electrical system to the generator interface and electrically connecting the building electrical system to the utility wires; and
    (c) an alarm connected to the cabinet and configured to provide an alert if the building electrical system and the generator interface are electrically connected through the transfer switch and the door to the generator connection compartment is in the open position.

2. The electrical docking station of claim 1, wherein the generator connection compartment and the utility connection compartment are positioned side by side in the cabinet.

3. The electrical docking station of claim 1, wherein the transfer switch is housed in the cabinet.

4. The electrical docking station of claim 3, wherein the cabinet includes a main section and a lower section, the main section housing the transfer switch, and the generator connection compartment and the utility connection compartment being in the lower section.

5. The electrical docking station of claim 1, wherein:
    the generator interface includes one or more connection receptacles, each connection receptacle being configured to receive a connector and cable from the generator,
    the generator connection compartment includes a bottom surface with one or more cable slots, each cable slot having a width that allows the cable to pass through the cable slot but prevents the connector from passing through the cable slot, and
    the generator interface is positioned at an angle that is non-perpendicular with a back side of the cabinet.

6. The electrical docking station of claim 1, further comprising:
    (d) an electro-mechanical locking mechanism configured to lock the door if the building electrical system and the generator interface are electrically connected through the transfer switch and the door is in the closed position.

7. The electrical docking station of claim 6, further comprising:
    (e) a power supply electrically connected between the generator interface and the electro-mechanical locking mechanism, the power supply being configured to convert high-voltage AC input power from the generator interface to DC output power and to send converted generator power to the electro-mechanical locking mechanism.

8. The electrical docking station of claim 1, wherein the alert comprises an audible signal.

9. The electrical docking station of claim 1, wherein the alert comprises a visual signal.

10. The electrical docking station of claim 1, wherein the alert comprises an audible signal and a visual signal.

11. An electrical docking station, comprising:
    (a) a cabinet that includes a generator connection compartment and a utility connection compartment, the generator connection compartment including a door movable between an open position and a closed position, the utility connection compartment being configured to house utility wires;
    (b) a generator interface housed in the generator connection compartment and configured to be electrically connected to a generator and to a transfer switch, the transfer switch being electrically connected to the utility wires and to a building electrical system, the transfer switch being configured to switch between electrically connecting the building electrical system to the generator interface and electrically connecting the building electrical system to the utility wires; and
    (c) an electro-mechanical locking mechanism electrically connected to the generator interface and configured to lock the door to the generator connection compartment if the building electrical system and the generator interface are electrically connected through the transfer switch and the door is in the closed position.

12. The electrical docking station of claim 11, wherein the generator connection compartment and the utility connection compartment are positioned side by side in the cabinet.

13. The electrical docking station of claim 11, wherein the cabinet includes a main section and a lower section, the generator connection compartment and the utility connection compartment being in the lower section.

14. The electrical docking station of claim 11, wherein:
    the generator interface includes one or more connection receptacles, each connection receptacle being configured to receive a connector and cable from the generator,
    the generator connection compartment includes a bottom surface with one or more cable slots, each cable slot having a width that allows the cable to pass through the cable slot but prevents the connector from passing through the cable slot, and
    the generator interface is positioned at an angle that is non-perpendicular with a back side of the cabinet.

15. The electrical docking station of claim 11, further comprising:
    (d) a power supply electrically connected between the generator interface and the electro-mechanical locking mechanism, the power supply being configured to convert high-voltage AC input power from the generator interface to DC output power and to send converted generator power to the electro-mechanical locking mechanism.

16. The electrical docking station of claim 11, further comprising:
    (d) an alarm connected to the cabinet and configured to provide an alert if the building electrical system and the generator interface are electrically connected through the transfer switch and the door to the generator connection compartment is in the open position.

17. The electrical docking station of claim 16, wherein the alert comprises an audible signal, a visual signal, or both.

18. A method, comprising:
   (a) providing an electrical docking station that comprises:
       (i) a cabinet that includes a generator connection compartment and a utility connection compartment, the generator connection compartment including a door movable between an open position and a closed position, the utility connection compartment housing utility wires,
       (ii) a generator interface housed in the generator connection compartment and electrically connected to a generator and to a transfer switch, the transfer switch being electrically connected to the utility wires and to a building electrical system, and
       (iii) an electro-mechanical locking mechanism electrically connected to the generator interface;
   (b) switching, with the transfer switch, (i) from electrically connecting the building electrical system to the utility wires (ii) to electrically connecting the building electrical system to the generator interface; and
   (c) locking, with the electro-mechanical locking mechanism, the door to the generator connection compartment when the building electrical system and the generator interface are electrically connected through the transfer switch and the door is in the closed position.

19. The method of claim 18, further comprising:
   (d) switching, with the transfer switch, (i) from electrically connecting the building electrical system to the generator interface (ii) to electrically connecting the building electrical system to the utility wires; and
   (e) unlocking, with the electro-mechanical locking mechanism, the door to the generator connection compartment when the building electrical system and the utility wires are electrically connected through the transfer switch.

20. The method of claim 18, wherein step (b) comprises automatically switching upon detection that no power is coming from the utility wires.

21. The method of claim 20, further comprising:
   (d) automatically switching, with the transfer switch, upon detection that power is coming from the utility wires, (i) from electrically connecting the building electrical system to the generator interface (ii) to electrically connecting the building electrical system to the utility wires.

22. The method of claim 18, further comprising:
   (d) connecting a load bank to the generator interface; and
   (e) applying an ancillary load with the load bank.

23. The method of claim 18, wherein the electrical docking station further comprises:
   (v) a power supply electrically connected between the generator interface and the electro-mechanical locking mechanism, the power supply converting high-voltage AC input power from the generator interface to DC output power and sending converted generator power to the electro-mechanical locking mechanism.

24. The method of claim 18, further comprising:
   (d) providing an alert if the building electrical system and the generator interface are electrically connected through the transfer switch and the door to the generator connection compartment is in the open position.

25. The method of claim 24, wherein the alert comprises an audible signal, a visual signal, or both.

\* \* \* \* \*